(12) United States Patent
Krowiak et al.

(10) Patent No.: US 7,344,317 B2
(45) Date of Patent: Mar. 18, 2008

(54) RUGGED MT-MT CONNECTOR

(75) Inventors: Mark Krowiak, Oak Park, IL (US); Joe Sutton, Elmhurst, IL (US); Mark Waldron, Poplar Grove, IL (US)

(73) Assignee: Stratos International, Inc., Chicago, IL (US)

( * ) Notice: Subject to any disclaimer, the term of this patent is extended or adjusted under 35 U.S.C. 154(b) by 0 days.

(21) Appl. No.: 11/655,031

(22) Filed: Jan. 18, 2007

(65) Prior Publication Data

US 2007/0116412 A1    May 24, 2007

Related U.S. Application Data

(63) Continuation of application No. 11/265,393, filed on Nov. 2, 2005, now Pat. No. 7,234,875.

(51) Int. Cl.
*G02B 6/36* (2006.01)
(52) U.S. Cl. .............................. 385/78; 385/60; 385/72
(58) Field of Classification Search .................. 385/53, 385/56, 59, 60, 62, 71, 72, 78
See application file for complete search history.

(56) References Cited

U.S. PATENT DOCUMENTS 5,838,856 A    11/1998    Lee .............................. 385/54

*Primary Examiner*—Sarah Song
(74) *Attorney, Agent, or Firm*—Karl D. Kovach

(57) ABSTRACT

The device includes a ferrule, a housing, a first gap, and a holder. The housing having a recess, a first cantilever spring, a second cantilever spring. The recess accommodates the ferrule. The first cantilever spring has a first contact area, and the second cantilever spring has a second contact area. The holder having a ferrule seating surface, first, second, third, and fourth cantilever spring seating surfaces, and a second gap. The holder is interposed between the ferrule, and the first and second cantilever springs. The first and second cantilever spring seating surfaces contact the first contact area if the first cantilever spring. The third and fourth cantilever spring seating surfaces contact the second contact area of the second cantilever spring. The ferrule contacts the ferrule seating surface of the holder.

4 Claims, 5 Drawing Sheets

RUGGED MT-MT CONNECTOR

This is a continuation of U.S. patent application Ser. No. 11/265,393, now U.S. Pat. No. 7,234,875, filed Nov. 2, 2005, which is hereby incorporated herein by reference.

BACKGROUND OF THE INVENTION

1. Field of the Invention

The present invention pertains to fiber optic connectors and components of fiber optic connectors. The invention more particularly concerns components used to make an optical connection between two ferrules.

2. Discussion of the Background

Connectors which mate MT style ferrules are known in the art. One such connector 10 is shown in FIG. 1. The connector 10 includes a ferrule 12, a spring 22, alignment pins 14, 18, alignment pin holders 16, 20, and housing halves 24, 26. Each housing half 24, 26 is hermaphroditic. The housing halves 24, 26 retain the ferrule 12, the spring 22, the alignment pins 14, 18, and the alignment pin holders 16, 20. The ferrule 12 conforms to the MT standard. The spring 22 is a coiled, compression spring having closed ends.

When another connector similar to connector 10 is introduced to connector 10, the other connector does not have alignment pins 14, 18 since the ferrule of the other connector has alignment pin receiving holes which accept the alignment pins 14, 18 of connector 10 so as to align the two connectors. Alignment is critical so that optical communication is realized between the optical fibers of the two mating ferrules.

Also, when the two MT style ferrules mate, the mating ends 13 of the ferrules butt up against one another. For continuous optical communication between the two ferrules, the two ferrules must maintain contact with one another. The housing, formed of housing halves 24, 26, contains the spring 22 which contacts the ferrule 12. When connector 10 is mated with the other connector, the ferrule 12 compresses the spring 22 so that a force is transmitted between the mating end 13 of each ferrule so as to keep the mating ends 13 in contact with one another.

When the connector 10 is attached to a fiber optic ribbon cable, the ribbon cable must be thread through the spring 22 before the ferrule 12 is attached to the ribbon cable. FIG. 2 is a perspective view of the assembly of the ferrule 12 to a fiber optic ribbon cable 30. One end of the ribbon cable 30 is pig tailed into an optoelectronic device 36. The other end of the ribbon cable 30 has multiple optical fibers 32 ready for termination to a ferrule. Since the ferrule 12 is larger than the inside diameter of the coiled spring 22, the ribbon cable 30 is thread through the inside diameter of the coiled spring 22, and then the multiple optical fibers 32 of the ribbon cable 30 are terminated with the ferrule 12. Once this procedure is complete, then the alignment pins 14, 18, the alignment pin holders 16, 20, and the housing halves 24, 26 are added so as to complete the termination of the ribbon cable 30.

Some optoelectronic devices are pig tailed and pre-terminated with an MT ferrule. FIG. 3 is a perspective view of such a device. Also, some jumper cables are pre-terminated with each end of the jumper cable being terminated with respective MT ferrules. Optoelectronic devices 36 and jumper cables terminated in such a way can not be used with the components shown in FIG. 1 since the ferrule 12 will not fit through the inside diameter of the coiled spring 22. To salvage such devices, the ribbon cable 30 is cut so as to expose the optical fibers, then the ribbon cable 30 is threaded through the inside diameter of the spring 22, and then the optical fibers of the ribbon cable 30 are terminated to the ferrule 12. The labor involved in such work is expensive.

Another draw back to the connector 10 of FIG. 1 is that in extreme shock, vibration, and thermal environments, the mating ends 13 of two mating ferrules 12 may lose contact with one another. In shock and vibration environments, the mass of the ferrule 12 may be accelerated which generates a force. If the force is great enough, the ferrule 12 will further compress the spring 22 thus causing the ferrule 12 to move away from the other ferrule. Such loss of contact results in a loss of optical communication between the two ferrules. In an extreme thermal environment, the housing halves 24, 26, the ferrule 12, and the spring 22 may grow or shrink relative to one another at various rates due to different values of the respective coefficients of thermal expansion of the materials that make up each of the listed piece parts. If the piece parts grow or shrink too much relative to each other, the spring 22 will lose its compressive load. Once the compressive load is lost, the mating ends 13 of the ferrules 12 will lose contact with each other. If the mating ends 13 of the ferrules 12 lose contact with each other, then the ferrules lose optical communication with one another. The loss of optical communication is not desirable.

SUMMARY OF THE INVENTION

It is an object of the invention to provide a device which can connectorize a pigtailed optoelectronic device or jumper cable that already has the ends of its respective ribbon cable terminated to a ferrule.

It is another object of the invention to provide a device which will prevent the mating face of a ferrule from losing contact with a mating face of another ferrule during extreme shock, vibration, and thermal conditions.

In one form of the invention the device includes a ferrule, a housing, a first gap, and a holder. The housing having a recess, a first cantilever spring, a second cantilever spring. The recess accommodates the ferrule. The first cantilever spring has a first contact area, and the second cantilever spring has a second contact area. The holder having a ferrule seating surface, first, second, third, and fourth cantilever spring seating surfaces, and a second gap. The holder is interposed between the ferrule, and the first and second cantilever springs. The first and second cantilever spring seating surfaces contact the first contact area if the first cantilever spring. The third and fourth cantilever spring seating surfaces contact the second contact area of the second cantilever spring. The ferrule contacts the ferrule seating surface of the holder. The first gap of the housing and the second gap of the holder allow a pre-terminated ribbon cable to pass through the first gap and the second gap so that the ferrule is properly seated in the recess of the housing. When a force is applied to a mating end of the ferrule, the cantilever springs react the force.

Thus, the invention achieves the objectives set forth above. The invention provides a device which connectorizes a pre-terminated jumper cable or pig tailed optoelectronic device, and which withstands extreme shock, vibration, and thermal environments.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
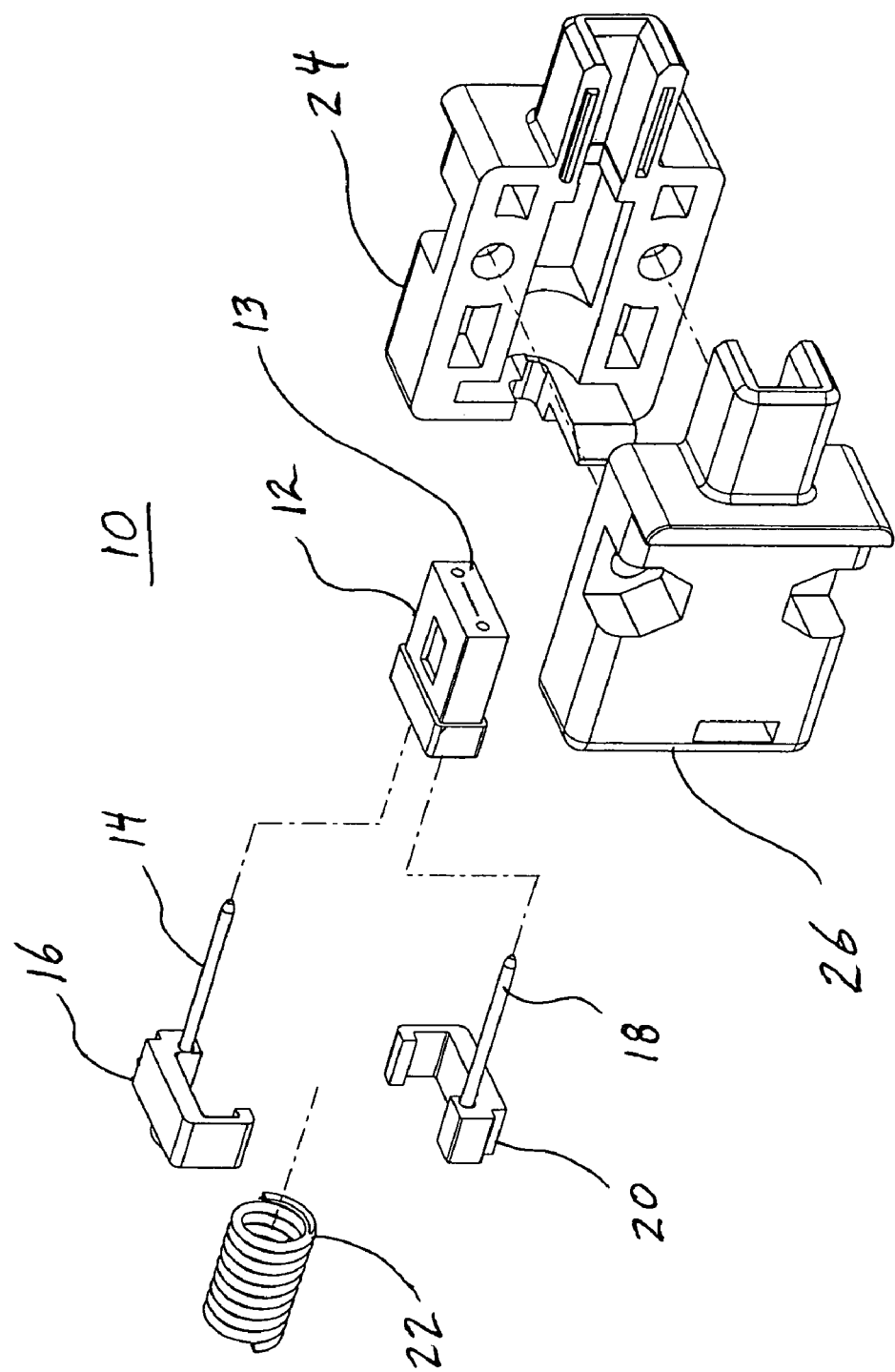
FIG. 1 is an exploded perspective view of an MT ferrule connector assembly.
Figure 2:
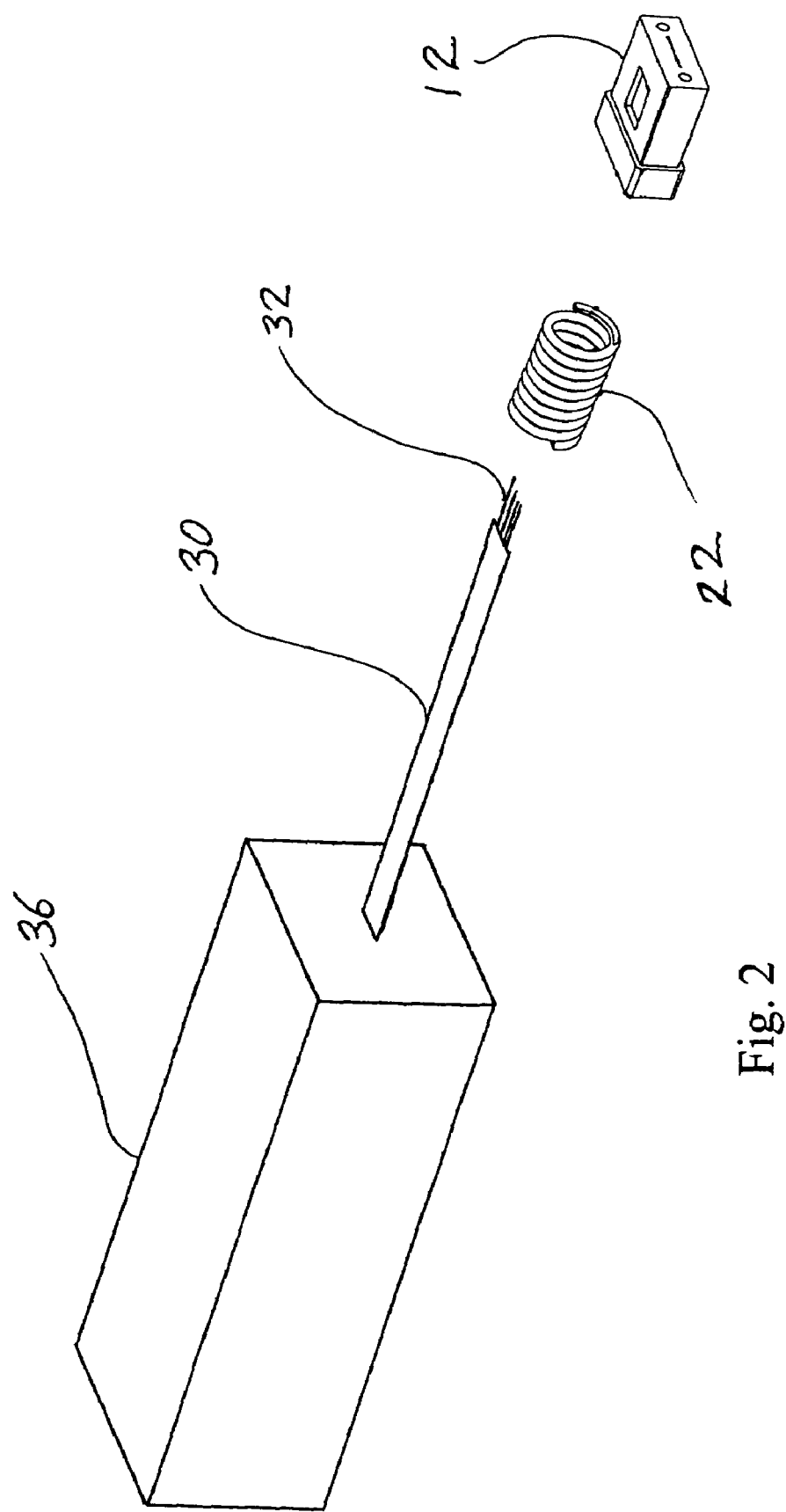
FIG. 2 is a perspective view of an assembly of an MT ferrule, a coiled spring, a ribbon cable, and an optoelectronic device.
Figure 3:
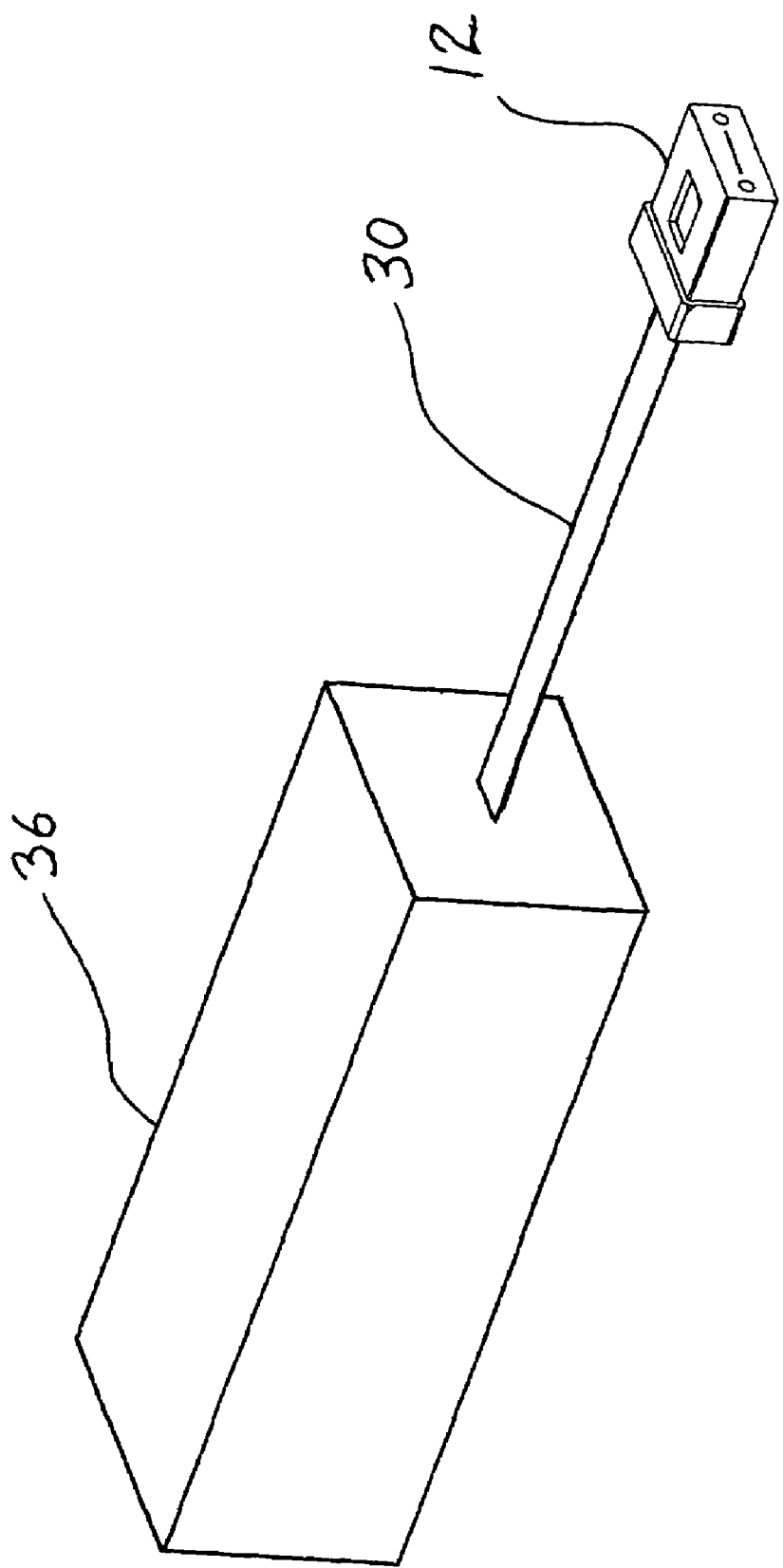
FIG. 3 is a perspective view of a pig tailed optoelectronic device where the ribbon cable is pre-terminated with an MT ferrule.
Figure 4:
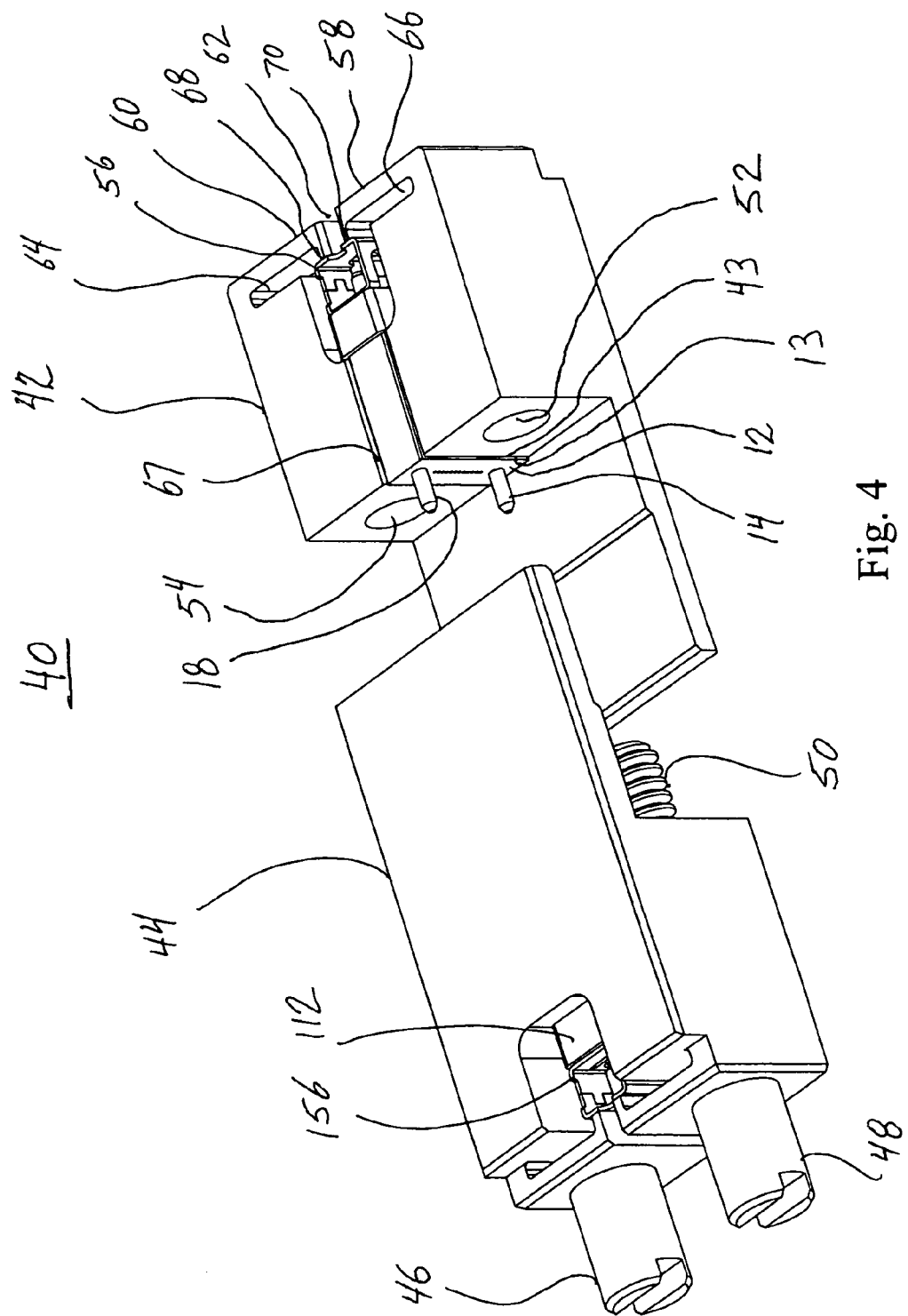
FIG. 4 is a perspective view of a MT ferrule connector according to an embodiment of the invention.
Figure 5:
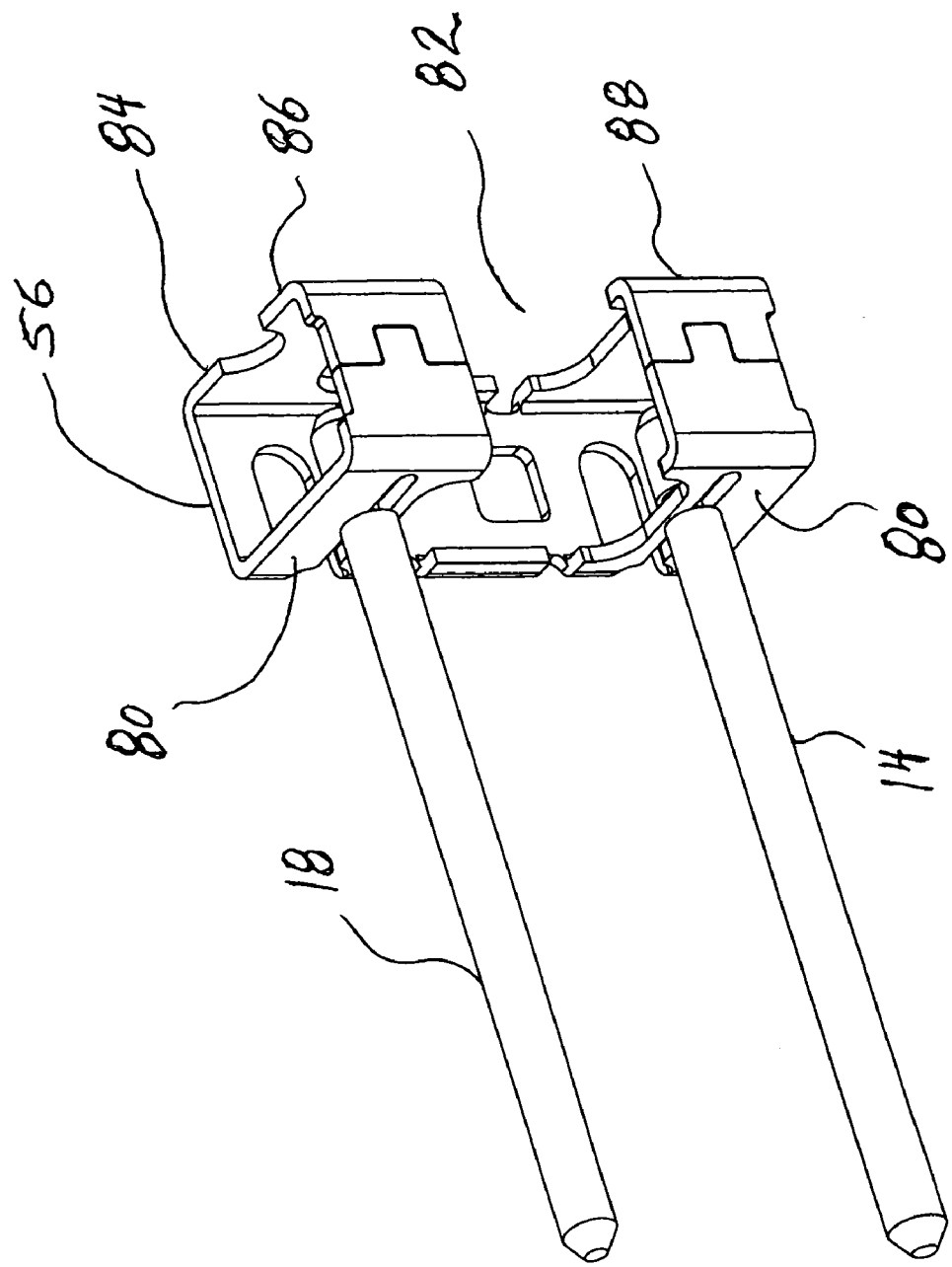
FIG. 5 is a perspective view of a holder of the MT ferrule connector of FIG. 4 with alignment pins.

Referring now to the drawings, wherein like reference numerals designate identical or corresponding parts throughout the several views, and more particularly to FIGS. 4, and 5 thereof, an embodiment of the present invention is displayed therein.

FIG. 4 is a perspective view of a MT-MT ferrule connector 40. The MT-MT connector 40 includes a first housing 42, a first holder 56, a first ferrule 12, a second housing 44, a second holder 156, a second ferrule 112, a first alignment pin 14, a second alignment pin 18, a first threaded fastener 48, and a second threaded fastener 46. The fist housing 42 and the second housing 44 are hermaphroditic. The first housing 42 and the second housing 44 are constructed of a metallic material. Ferrule 12 is substantially identical to ferrule 112. A thread form 50 of the first threaded fastener 48 is shown in FIG. 4.

The first housing 42 includes a first cantilever spring 58, and a second cantilever spring 60, a recess 67 for accommodating the first ferrule 12, a gap 62 for accommodating a ribbon cable 30, a gap 66 for the proper functioning of the first cantilever spring 58, a gap 64 for the proper functioning of the second cantilever spring 60, a first threaded hole 52, and a second threaded hole 54. Also shown is an edge 43 of a surface of the first housing 42.

The first cantilever spring 58 includes a first contact area 70. The second cantilever spring 60 includes a second contact area 68.

FIG. 5 is a perspective view of the first holder 56. The first holder 56 has a shape of a generally box like structure. The first holder 56 includes a ferrule seating surface 80, first and second cantilever spring seating surfaces 86, 88, and third and fourth cantilever spring seating surfaces 84, and a gap 82. The gap 82 accommodates the passage of the ribbon cable 30 past the first holder 56. The first holder 56 is constructed of a metallic material. The first holder 56 is substantially rigid. The first holder 56 is substantially identical to the second holder 156.

The first alignment pin 14 and the second alignment pin 18 are attached to the first holder 56 by an interference fit, welding, staking, or by any other suitable fastening method.

The first ferrule 12 has a first alignment pin receiving hole, and a second alignment pin receiving hole. The first ferrule 12 conforms to the MT standard. The first ferrule 12 is substantially identical to the second ferrule 112. The first alignment pin 14 passes through the first alignment pin receiving hole of the first ferrule 12, and the second alignment pin 18 passes through the second alignment pin receiving hole of the first ferrule 12, as shown in FIG. 4.

The first contact area 70 of the first cantilever spring 58 contacts the first and second cantilever spring seating surfaces 86, 88 of the first holder 56. The second contact area 68 of the second cantilever spring 60 contacts the third and fourth seating cantilever spring seating surfaces 84 of the first holder 56. The ferrule seating surface 80 of the first holder 56 contacts the ferrule 12, as shown in FIG. 4. The mating end 13 of the ferrule 12 extends beyond the edge 43 of a surface of the first housing 42.

When the assembled second housing 44 is attached to the assembled first housing 42, the first and second threaded fasteners 48, 46 are introduced in the first and second threaded holes 52, 54 of the first housing 42. The first and second threaded fasteners 48, 46 are tightened until the desired compressive force is generated at the interface of the first ferrule 12 and the second ferrule 112. As the first and second housings 42, 44 come closer together, the first alignment pin 14 and the second alignment 18 are guided into the first and second alignment pin receiving holes of the second ferrule 112. Thus, optical fibers terminated in the first ferrule 12 and the second ferrule 112 will be in optical communication.

As the first and second threaded fasteners 48, 46 are increasingly tightened, the compressive load or force generated at the mating ends 13 of the first ferrule 12 and the second ferrule 112 increases. The force is reacted at the other end of the first ferrule 12 by the ferrule seating surface 80 of the first holder 56. The force is then reacted at the first and second cantilever spring seating surfaces 86, 88 of the first holder 56 by the first contact area 70 of the first cantilever spring 58, and by the third and fourth cantilever spring seating surfaces 84 of the first holder 56 by the second contact area 68 of the second cantilever spring 60.

As the force flows into the first and second cantilever springs 58, 60, the first and second cantilever springs 58, 60 flex. Assuming that each of the first and second cantilever springs 58, 60 are equally as stiff or compliant, then each of the first and second cantilever springs 58, 60 will react approximately one half of the force generated at the interface of the first ferrule 12 and the second ferrule 112. The stiffness or compliance of the first cantilever spring 58 is determined by the material used to construct the first housing 42 and on the length, width, and thickness of the first cantilever spring 58. Some of that geometry can be controlled by the size of the gap 66. The design of the second cantilever spring 60 is guided by the same principles. The force flows through the second ferrule 112, the second holder 156, and the cantilever springs of the second housing 44. The first and second threaded fasteners 48, 46 are tightened to a pre-determined force level which is great enough to ensure that the mating end of the first ferrule 12 does not lose contact with the mating end of the second ferrule 112 while the connector 40 is subject to the intended extreme shock, vibration, and thermal environments. Thus, optical communication will be maintained through the MT-MT connector 40, and the assembly can accommodate a pre-terminated ribbon cable 30.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
   a ferrule;
   a housing having a first cantilever spring, a second cantilever spring, a recess for accommodating the ferrule, and a first gap, the first cantilever spring having a first contact area, and the second cantilever spring having a second contact area; and a holder having a ferrule seating surface, first, second, third, and fourth cantilever spring seating surfaces, and a second gap, the holder interposed between the ferrule, and the first cantilever spring and the second cantilever spring, and wherein the first and second cantilever spring seating surfaces contact the first contact area of the first cantilever spring, and the third and fourth cantilever spring seating surfaces contact the second contact area of the second cantilever spring, and the ferrule contacts the ferrule seating surface of the holder, and wherein the second gap of the holder and the first gap of the housing allow a pre-terminated ribbon cable to pass through the first gap and the second gap so that the ferrule is properly seated in the recess of the housing.

2. A device according to claim 1 wherein the ferrule conforms to the MT standard.

3. A device according to claim 2, further comprising a first alignment pin attached to the holder, and a second alignment pin attached to the holder.

4. A device according to claim 3 wherein the ferrule has a first alignment hole for accommodating the first alignment pin, and a second alignment hole for accommodating the second alignment pin.

* * * * *